(12) United States Patent
Kuboshima

(10) Patent No.: US 10,880,140 B2
(45) Date of Patent: Dec. 29, 2020

(54) RECEIVE DEVICE, RECORDING MEDIUM FOR DETECTING SIGNAL

(71) Applicant: JVCKENWOOD Corporation, Yokohama (JP)

(72) Inventor: Ryo Kuboshima, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 16/795,627

(22) Filed: Feb. 20, 2020

(65) Prior Publication Data

US 2020/0267034 A1    Aug. 20, 2020

(30) Foreign Application Priority Data

Feb. 20, 2019  (JP) .................................. 2019-028499

(51) Int. Cl.
| | |
|---|---|
| *H04L 27/00* | (2006.01) |
| *H04L 27/22* | (2006.01) |
| *H04B 17/318* | (2015.01) |
| *H04B 1/16* | (2006.01) |

(52) U.S. Cl.
CPC ............... *H04L 27/22* (2013.01); *H04B 1/16* (2013.01); *H04B 17/318* (2015.01)

(58) Field of Classification Search
CPC .......... H04L 27/22; H04B 1/16; H04B 17/318
See application file for complete search history.

(56) References Cited

U.S. PATENT DOCUMENTS

| 5,994,953 | A  | * | 11/1999 | Burshtein | ........... | H04L 27/1525 |
|---|---|---|---|---|---|---|
| | | | | | | 329/300 |
| 2002/0001354 | A1 | * | 1/2002 | McNally | ............... | H04L 25/063 |
| | | | | | | 375/317 |
| 2011/0151814 | A1 | * | 6/2011 | Takeuchi | ............. | H04B 1/1036 |
| | | | | | | 455/213 |
| 2019/0369217 | A1 | * | 12/2019 | Policht | .................. | G01S 7/4865 |

FOREIGN PATENT DOCUMENTS

JP          2011135208 A       7/2011

* cited by examiner

*Primary Examiner* — Dhaval V Patel
(74) *Attorney, Agent, or Firm* — Brundidge & Stanger, P.C.

(57) ABSTRACT

A receive device includes: a quadrature detector; and a first signal detector that detects whether a signal subjected to detection in the quadrature detector is a received signal. The first signal detector assigns the signal subjected to quadrature detection in the quadrature detector to an orthogonal plane divided into a plurality of quadrants and derives an amount of movement of the signal assigned between quadrants, integrates absolute values of derived amounts of movement over a predetermined period of time, and determines whether the signal subjected to quadrature detection is a received signal by comparing an integrated value derived from integration with a threshold value.

2 Claims, 5 Drawing Sheets

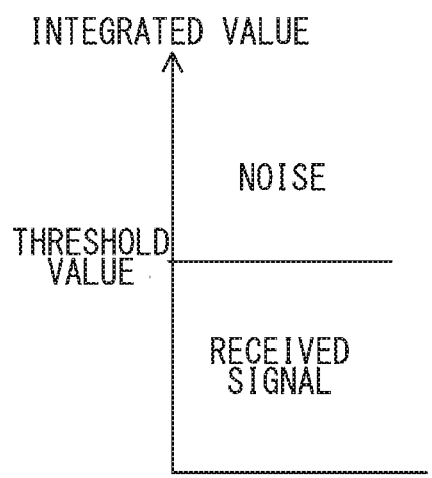 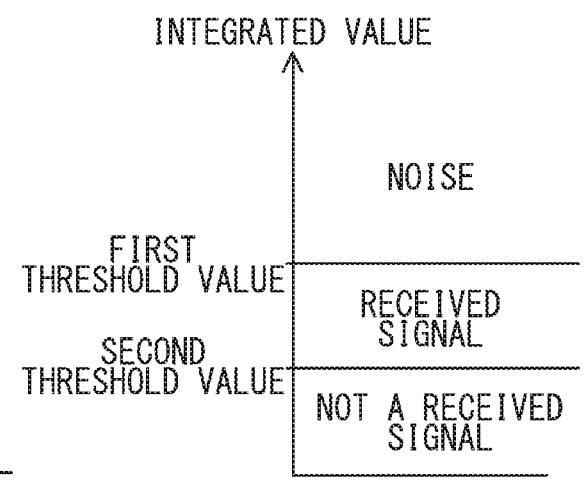

RECEIVE DEVICE, RECORDING MEDIUM FOR DETECTING SIGNAL

CROSS-REFERENCE TO RELATED APPLICATION

This application is based upon and claims the benefit of priority from the prior Japanese Patent Application No. 2019-28499, filed on Feb. 20, 2019, the entire contents of which is incorporated herein by reference.

BACKGROUND OF THE INVENTION

1. Field

The present invention relates to signal detection technologies and, in particular, a receive device and a recording medium for detecting signal.

2. Description of the Related Art

A wireless device performs a signal detection process and performs a signal receive operation when a signal is detected. In the related art, signal detection is performed in two stages including Received Signal Strength Indication and squelch (see, for example, patent literature 1).

[Patent literature 1] JP2011-135208

In the presence of an antenna that is mounted, RSSI detection results, with a high probability, in a determination that a signal is available due to the impact from ambient noise, and so squelch detection is frequently performed. Squelch determination requires about 60 ms for a demodulation process and integration of noise signals and so lowers the speed of signal detection.

SUMMARY OF THE INVENTION

A receive device according to an embodiment includes: a quadrature detector; and a first signal detector that detects whether a signal subjected to detection in the quadrature detector is a received signal. The first signal detector includes a memory storing a program, wherein the program when executed by a computer, causes the computer to perform operations including: assigning the signal subjected to quadrature detection in the quadrature detector to an orthogonal plane divided into a plurality of quadrants and deriving an amount of movement of the signal assigned between quadrants; integrating absolute values of derived amounts of movement over a predetermined period of time; and determining whether the signal subjected to quadrature detection is a received signal by comparing an integrated value derived from the integrating with a threshold value.

Optional combinations of the aforementioned constituting elements, and implementations of the embodiments in the form of methods, apparatuses, systems, recording mediums, and computer programs may also be practiced as additional modes of the embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A and 4B show an outline of the process in the determiner of FIG. 2.

DETAILED DESCRIPTION OF THE PREFERRED EMBODIMENT

The invention will now be described by reference to the preferred embodiments. This does not intend to limit the scope of the present invention, but to exemplify the invention.

A summary of the present invention will be given before describing the invention in specific detail. An embodiment of the present invention relates to a receive device for receiving radio signals. The receive device performs, for example, quadrature detection of direct conversion type. As mentioned above, the speed of signal detection is lowered when squelch determination is performed for signal detection. In recent years, wireless devices are available in smaller sizes and, associated with this, are designed to perform squelch detection in a digital signal processor (DSP) in a one-chip microcomputer, and this results in a larger current being consumed when squelch detection is performed. For this reason, high speed of signal detection and inhibition of an increase in the standby current are called for. To address the issue, the receive device according to the embodiment discriminate between a signal and noise at a high speed by acquiring the number of times of movement between quadrants on a constellation.

Figure 1:
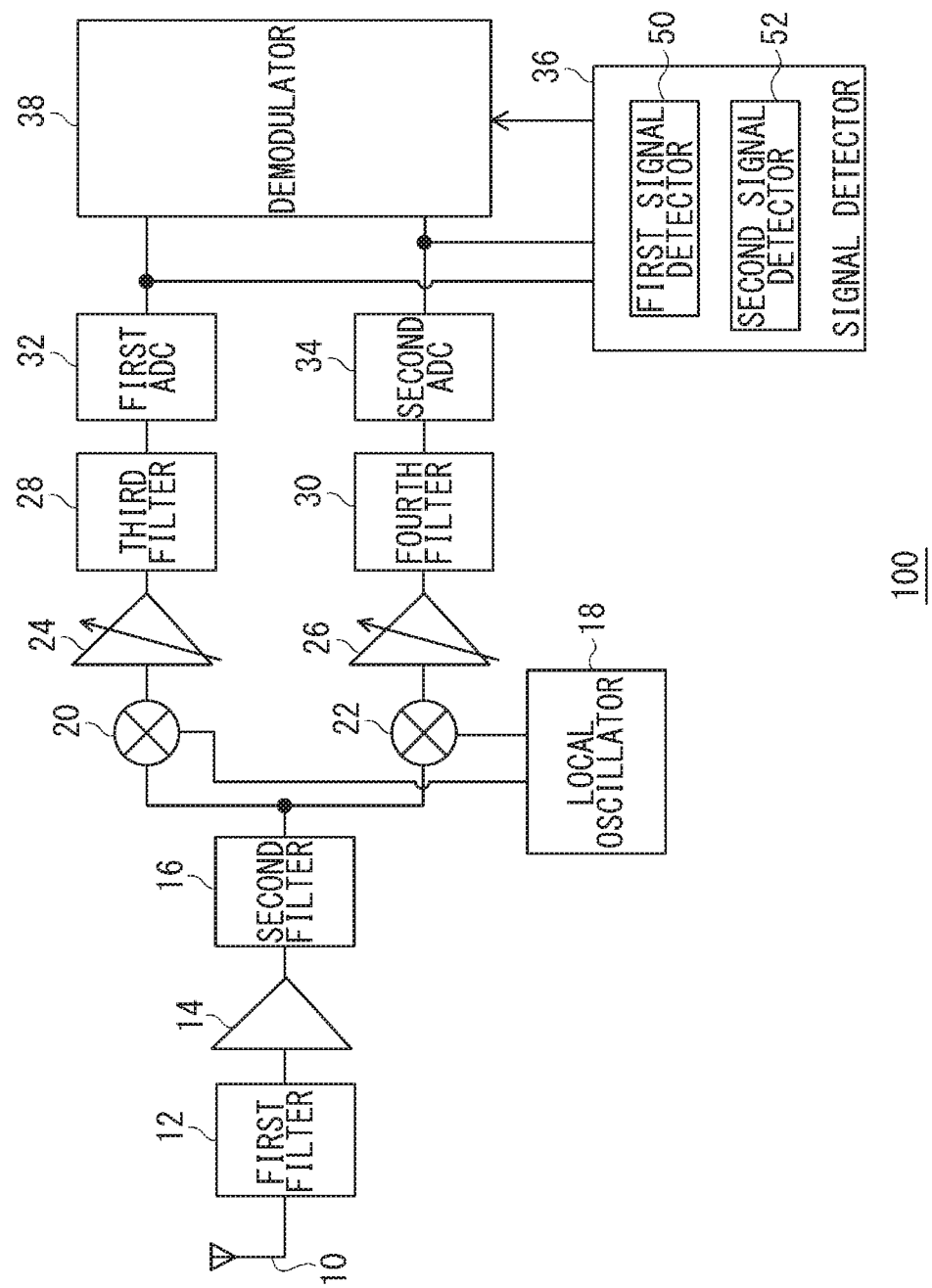
FIG. 1 shows features of a receive device according to the embodiment.

FIG. 1 shows features of a receive device 100. The receive device 100 includes an antenna 10, a first filter 12, a low-noise amplifier 14, a second filter 16, a local oscillator 18, a first mixer 20, a second mixer 22, a first amplifier 24, a second amplifier 26, a third filter 28, a fourth filter 30, a first Analog to Digital Converter (ADC) 32, a second ADC 34, a signal detector 36, and a demodulator 38. The signal detector 36 includes a first signal detector 50 and a second signal detector 52.

The antenna 10 receives a Radio Frequency (RF) signal from a transmit device (not shown). For example, the RF signal is frequency-modulated (FM), but the modulation is not limited to FM. The antenna 10 outputs the received RF signal to the first filter 12. The first filter 12 reduces the noise component included in the RF signal. The first filter 12 outputs the RF signal with the noise component reduced (hereinafter, also referred to as "RF signal") to the low-noise amplifier 14.

The low-noise amplifier 14 amplifies the RF signal from the first filter 12. The low-noise amplifier 14 outputs the amplified RF signal to the second filter 16. The second filter 16 reduces the noise component included in the amplified RF signal. The second filter 16 outputs the amplified RF signal with the noise component reduced (hereinafter, also referred to as "RF signal") to the first mixer 20 and the second mixer 22.

The local oscillator 18 outputs a local oscillation signal to the first mixer 20 and the second mixer 22. The phase of the local oscillation signal output to the second mixer 22 is shifted by 90° from the phase of the local oscillation signal output to the first mixer 20. The first mixer 20 generates an I-phase base band signal (hereinafter, "I signal") by multiplying the RF signal from the second filter 16 by the local oscillation signal from the local oscillator 18. The first mixer 20 outputs the I signal to the first amplifier 24. The second mixer 22 generates a Q-phase base band signal (hereinafter, "Q signal") orthogonal to the I-phase base band signal by multiplying the RF signal from the second filter 16 by the local oscillation signal from the local oscillator 18. The second mixer 22 outputs the Q signal to the second amplifier 26.

The first amplifier 24 is a variable amplifier and regulates the level of the I signal. The first amplifier 24 outputs the I signal with the level regulated (hereinafter, also referred to as "I signal") to the third filter 28. The second amplifier 26 is a variable amplifier and regulates the level of the Q signal. The second amplifier 26 outputs the Q signal with the level regulated (hereinafter, also referred to as "Q signal") to the fourth filter 30.

The third filter 28 is a band-limiting filter that limits the band by eliminating, of the I signals from the first amplifier 24, signals of a frequency equal to or higher than the cut-off frequency. The third filter 28 outputs the I signal comprised of low-frequency components (hereinafter, also referred to as "I signal") to the first ADC 32. The fourth filter 30 is a band-limiting filter that limits the band by eliminating, of the Q signals from the second amplifier 26, signals of a frequency equal to or higher than the cut-off frequency. The fourth filter 30 outputs the Q signal comprised of low-frequency components (hereinafter, also referred to as "Q signal") to the second ADC 34. The features described above are designed to subject the RF signal to quadrature detection. These features are comprised of analog devices and are, for example, comprised of one chip. Quadrature detection may be performed by a digital signal process.

The first ADC 32 subjects the I signal from the third filter 28 to analog-to-digital conversion. The first ADC 32 outputs the digitized I signal (hereinafter, also referred to as "I signal") to the signal detector 36 and the demodulator 38. The second ADC 34 subjects the Q signal from the fourth filter 30 to analog-to-digital conversion. The second ADC 34 outputs the digitized Q signal (hereinafter, also referred to as "Q signal") to the signal detector 36 and the demodulator 38. The first ADC 32 and the second ADC 34 can be said to be a sampler that samples the signal subjected to quadrature detection according to a predetermined timing schedule. The third filter 28 and the fourth filter 30 may be antialiasing filters of a band based on the sampling frequency. In that case, a digital filter (not shown) may be provided after each of the first ADC 32 and the second ADC 34, and the digital filter may be used as a band-limiting filter.

Figure 2:
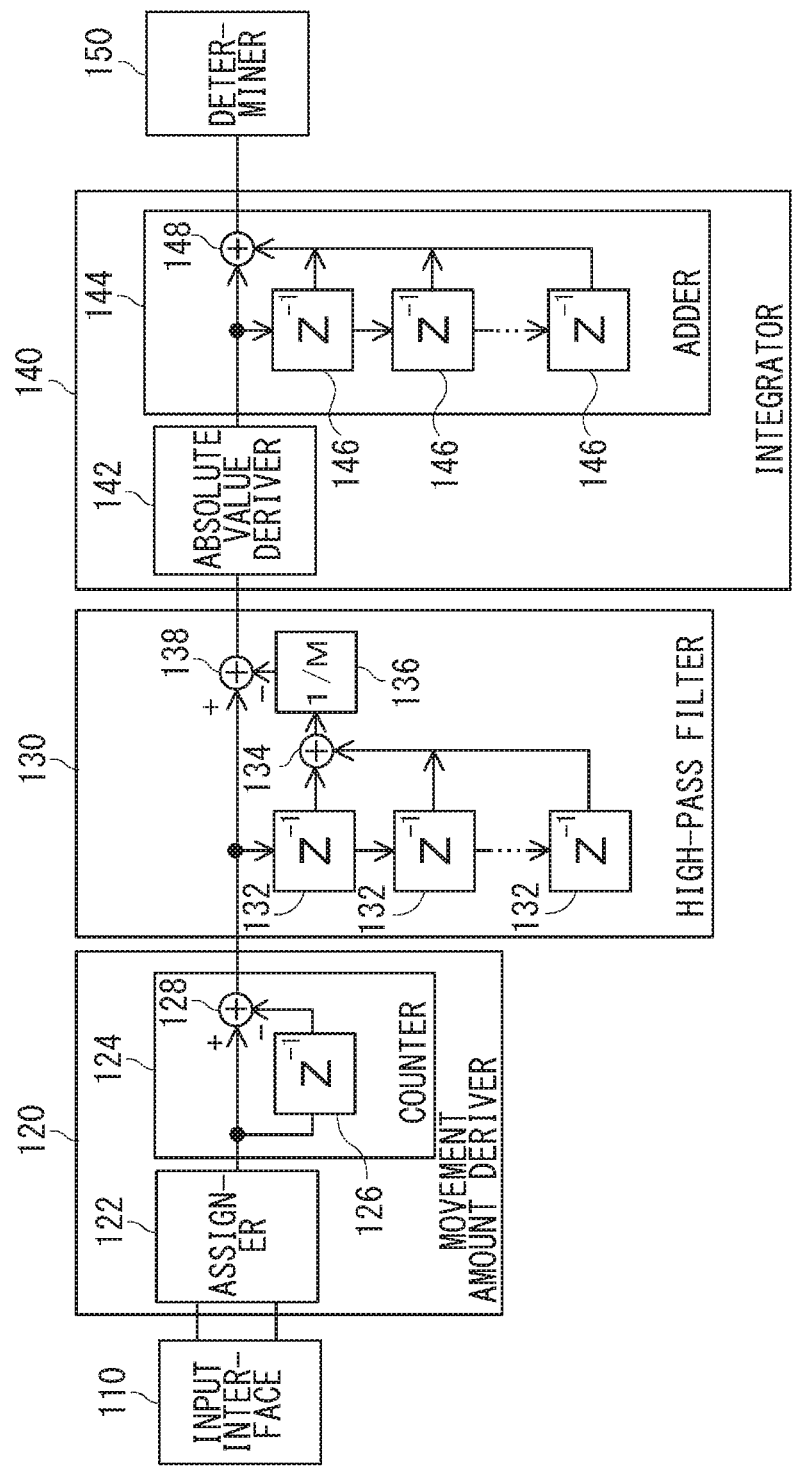
FIG. 2 shows features of the first signal detector of FIG. 1.

The signal detector 36 performs signal detection based on the I signal and the Q signal. FIG. 2 will be used to explain the features of the first signal detector 50. FIG. 2 shows features of the first signal detector 50. The first signal detector 50 includes an input interface 110, a movement amount deriver 120, a high-pass filter 130, an integrator 140, and a determiner 150. The movement amount deriver 120 includes an assigner 122 and a counter 124. The counter 124 includes a delayer 126 and an adder 128. The high-pass filter 130 includes a plurality of delayers 132, an adder 134, a divider 136, and an adder 138. The integrator 140 includes an absolute value deriver 142 and an adder 144. The adder 144 includes a plurality of delayers 146 and an adder 148.

Figure 3:
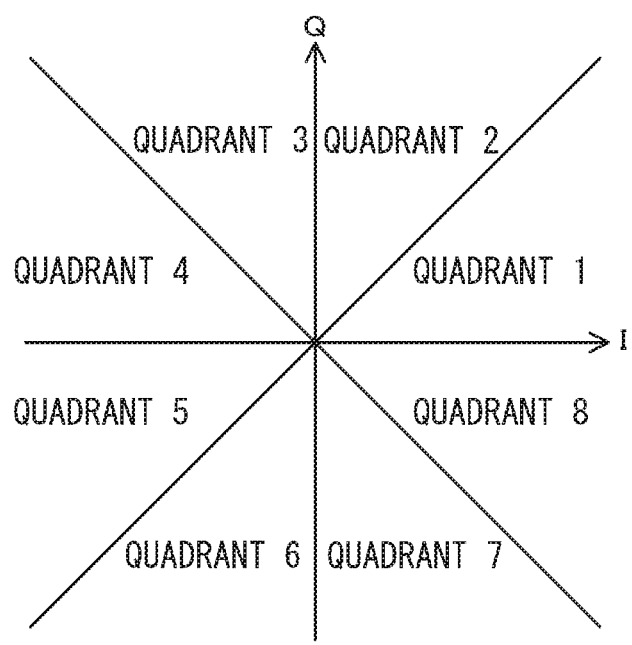
FIG. 3 shows a plurality of quadrants defined in the assigner of FIG. 2.

The input interface 110 receives the I signal and the Q signal subjected to quadrature detection and sampled according to a predetermined timing schedule. The I signal and the Q signal are subjected to band limiting by the band-limiting filter. The assigner 122 defines an orthogonal plane formed by an I axis and a Q axis. The orthogonal plane is divided into a plurality of quadrants. FIG. 3 shows a plurality of quadrants defined in the assigner 122. As illustrated, the orthogonal plane is divided into eight parts, and the plurality of quadrants are denoted by quadrant 1 through quadrant 8. Denoting the value of the input I signal as "I" and denoting the value of the input Q signal as "Q", the assigner 122 assigns the input I signal and the Q signal (hereinafter, generically referred to as "signals") to one of quadrant 1 through quadrant 8 according to the following determination condition.

Quadrant 1: $I \geq 0$, $Q \geq 0$, $|I| \geq |Q|$
Quadrant 2: $I \geq 0$, $Q \geq 0$, $|I| < |Q|$
Quadrant 3: $I < 0$, $Q \geq 0$, $|I| < |Q|$
Quadrant 4: $I < 0$, $Q \geq 0$, $|I| \geq |Q|$
Quadrant 5: $I < 0$, $Q < 0$, $|I| \geq |Q|$
Quadrant 6: $I < 0$, $Q < 0$, $|I| < |Q|$
Quadrant 7: $I \geq 0$, $Q < 0$, $|I| < |Q|$
Quadrant 8: $I \geq 0$, $Q < 0$, $|I| \geq |Q|$ When the signal is assigned to quadrant 1, the assigner 122 acquires "1". When the signal is assigned to quadrant 8, the assigner 122 acquires "8". Likewise for the other quadrants. Reference is made back to FIG. 2. The assigner 122 outputs the value of the quadrant to the counter 124.

The delayer 126 in the counter 124 delays the value of the quadrant received from the assigner 122 by a period of time of one sample. Further, the adder 128 subtracts the value of the quadrant delayed in the delayer 126 from the value of the quadrant received from the assigner 122. This is equivalent to deriving an amount of movement of the assigned signals between quadrants. When a movement to an adjacent quadrant is made, for example, the movement amount is determined to be "1" or "−1". The adder 128 outputs the movement amount to the high-pass filter 130.

The plurality of delayers 132 in the high-pass filter 130 successively delay the movement amounts from the counter 124. It will be assumed here that the number of delayers 132 is "M". The adder 134 adds the movement amounts output from the plurality of delayers 132. The divider 136 divides the movement amounts added in the adder 134 by M. These processes are equivalent to calculating an average value of the movement amounts derived in the movement amount deriver 120. The adder 138 derives a difference between the movement amount and the average value by subtracting the average value derived in the divider 136 from the movement amount from the counter 124. The above process in the high-pass filter 130 is equivalent to high-pass filtering. The high-pass filtering cancels the movement amount constantly occurring in a certain direction as an offset so that the variation in the movement amount is clearly identified. Given that the movement amounts are 3, 2, 1, 3, 2, 1, for example, subtraction of the average value of 2 results in 1, 0, −1, 1, 0, −1. The adder 138 outputs the difference to the integrator 140.

The absolute value deriver 142 in the integrator 140 receives the difference from the high-pass filter 130 and derives the absolute value of the difference. The absolute value deriver 142 outputs the absolute value of the difference to the adder 144. The plurality of delayers 146 in the adder 144 successively delay the differences from the absolute value deriver 142. The adder 148 adds the differences respectively output from the plurality of delayers 146 to the difference from the absolute value deriver 142. This is equivalent to integrating the absolute values of the differences derived in the high-pass filter 130 over a certain period of time. The adder 148 outputs the integrated value of the absolute values resulting from the addition to the determiner 150.

The determiner 150 determines whether the signal input in the input interface 110 is a received signal by comparing the integrated value determined by the integrator 140 with a threshold value. A received signal is defined as a signal that should be demodulated in the demodulator 38 described later and is a signal modulated in a radio propagation model subject to demodulation in the receive device 100 and transmitted accordingly. FIGS. 4A-4B show an outline of the process in the determiner 150. As shown in FIG. 4A, a threshold value for an integrated value is defined. The threshold value may be determined by, for example, simulated calculation. When the integrated value is smaller than the threshold value, the determiner 150 determines that the signal input in the input interface 110 is a received signal. When the integrated value is equal to larger than the threshold value, the determiner 150 determines that the signal input in the input interface 110 is not a received signal. That the signal is not a received signal means that noise is input. In the case of noise, the signal moves randomly on the quadrature plane, resulting in a large angular velocity on the quadrature plane and a large integrated value. In the case of a received signal, on the other hand, the upper limit of the angular speed on the orthogonal plane is determined by the modulation index (symbol rate) so that the integrated value will be smaller than that of noise.

Threshold values for the integrated value may be defined as shown in FIG. 4B. In this case, the first threshold value and the second threshold value are defined. The first threshold value corresponds to the threshold value of FIG. 4A, and the threshold values are related such that the first threshold value>the second threshold value. When the integrated value is equal to or larger than the first threshold value, the determiner 150 determines that the signal input in the input interface 110 is noise. When the integrated value is smaller than the first threshold value and equal to or larger than the second threshold value, the determiner 150 determines that the signal input in the input interface 110 is a received signal. When the integrated value is smaller than the second threshold value, it means that the amount of movement between quadrants is smaller as compared with the case in which a signal that should be demodulated by the demodulator 38 is received. For this reason, the determiner 150 determines that the signal input in the input interface 110 is not a signal that should be demodulated by the demodulator 38 and so is not a received signal. Reference is made back to FIG. 2. When the determiner 150 identifies a received signal, the determiner 150 directs the second signal detector 52 of FIG. 1 to perform an RSSI determination process. Reference is made back to FIG. 1.

When directed by the first signal detector 50 to perform an RSSI determination process, the second signal detector 52 derives RSSI based on the I signal and the Q signal. To discuss it in further detail, the second signal detector 52 is an RSSI detector and determines the absolute value of the output of the quadrature detector by calculating a square-root of sum of squares of or a sum of squares of the I signal and the Q signal. The absolute value is relevant to the level of the RF signal and so is equivalent to RSSI. When the RSSI is equal to larger than an RSSI determination threshold value, the second signal detector 52 determines that the signal is a received signal. When the RSSI is smaller than the RSSI determination threshold value, the second signal detector 52 determines that the signal is noise. To determine that the signal is a received signal is equivalent to detecting a signal. When a signal is detected, the second signal detector 52 notifies the demodulator 38 of the detection of a signal. When notified by the signal detector 36 of the detection of a signal, the demodulator 38 demodulates the I signal and the Q signal and outputs a demodulated audio signal or demodulated data. For demodulation, a publicly known technology may be used, and a description thereof is omitted.

The features are implemented in hardware such as a CPU, a memory, or other LSI's, of any computer and in software such as a program loaded into a memory and a program recorded in a non-transitory, computer-readable recording medium. The figure depicts functional blocks implemented by the cooperation of these elements. Therefore, it will be understood by those skilled in the art that the functional blocks may be implemented in a variety of manners by hardware only, software only, or by a combination of hardware and software.

Figure 5:
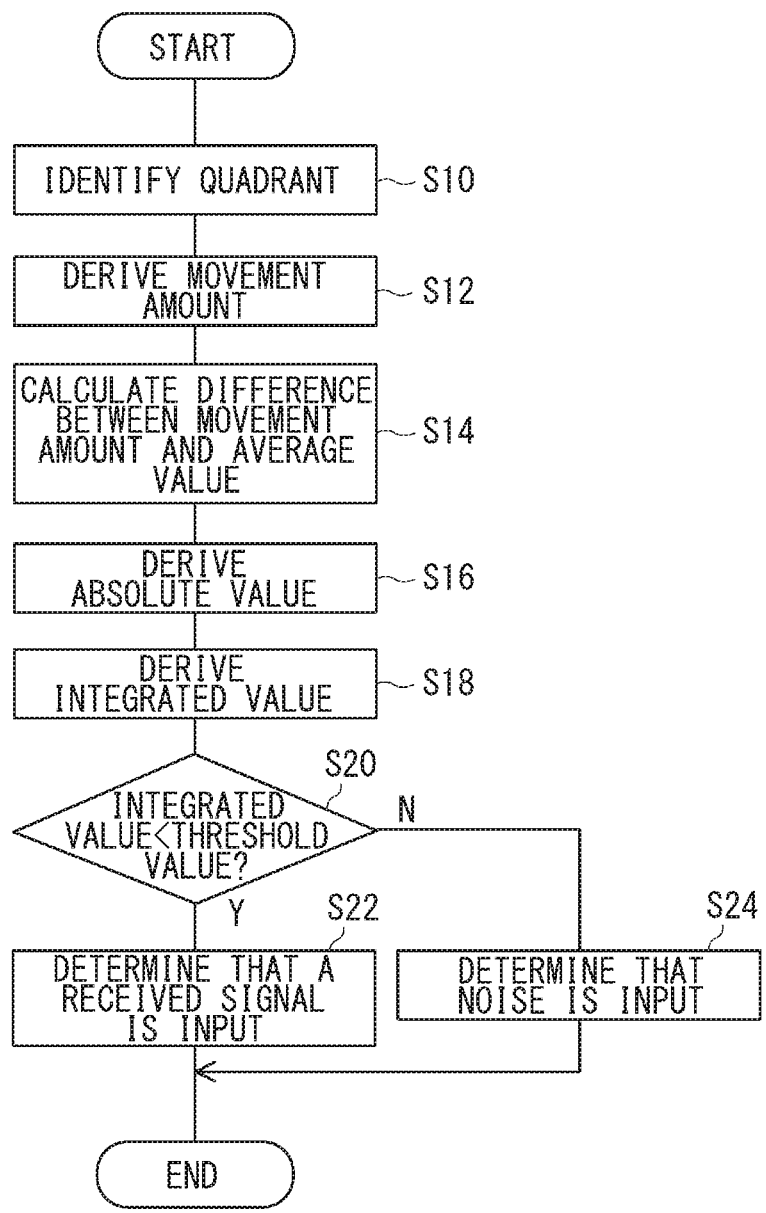
FIG. 5 is a flowchart showing steps of detection by the first signal detector of FIG. 2.

A description will be given of the operation of the receive device 100 having the above-described features. FIG. 5 is a flowchart showing steps of detection by the first signal detector 50. The assigner 122 identifies a quadrant (S10). The counter 124 calculates the movement amount (S12). The high-pass filter 130 derives a difference between the movement amount and the average value (S14). The absolute value deriver 142 derives the absolute value of the difference (S16). The adder 144 derives the integrated value (S18). When the integrated value is smaller than the threshold value (Y in S20), the determiner 150 determines that the signal is a received signal (S22). When the integrated value is not smaller than the threshold value (N in S20), on the other hand, the determiner 150 determines the signal to be noise (S24).

According to this embodiment, a determination as to whether the input signal is a received signal or not is made by comparing the absolute value of the amount of movement between quadrants with the threshold value. Accordingly, a determination can be made in a short period of time. Since a determination can be made in a short period of time, the speed of signal detection is increased. Further, demodulation such as that of squelch is not necessary so that the processing load on the DSP is reduced. Further, since the number of samples necessary to discriminate between a received signal and noise is smaller than the number of samples in the case of squelch determination, a discrimination can be made at a high speed. Since a determination can be made in a short period of time, current consumption is reduced. Since a received signal and noise are discriminated in a short period of time, the device can be operated in a low power consumption mode even when a large input noise is being received. Further, since the device can be operated in a low power consumption mode, the current consumed in a standby status is reduced. Further, since a difference between the average value of movement amount and the movement amount is derived and the difference is integrated over a predetermined period of time, the low-frequency component is reduced. Further, since the low-frequency component is reduced, the precision of determination is improved. Further, it is determined that the input signal is a received signal when the integrated is smaller than the threshold value, and it is determined that the input signal is not a received signal when the integrated value is equal to or larger than the threshold value. Therefore, a received signal and noise can be discriminated.

Described above is an explanation based on an exemplary embodiment. The embodiment is intended to be illustrative only and it will be understood by those skilled in the art that various modifications to constituting elements and processes could be developed and that such modifications are also within the scope of the present invention.

In the embodiment, the high-pass filter 130 is provided between the movement amount deriver 120 and the integrator 140. Alternatively, the high-pass filter 130 may be omitted, for example, and the movement amount deriver 120 and the integrator 140 may be connected. According to this variation, the amount of processing can be reduced.

In the embodiment, the threshold value is determined by simulated calculation, etc. The threshold value in the determiner 150 may be preset in accordance with the bandwidth of the received signal that should be input in the input interface 110. The bandwidth of the third filter 28 and the fourth filter 30 is configured to correspond to the frequency bandwidth occupied by the received signal that should be input. For this reason, the wider the occupied frequency bandwidth, the wider the bandwidth of the third filter 28 and the fourth filter 30 should be. This results in a higher frequency of noise and a larger movement amount. This shows that the threshold value for detecting noise should be changed in accordance with the bandwidth of the third filter 28 and the fourth filter 30. In other words, the determiner 150 configures the threshold value in accordance with the bandwidth of the band-limiting filter. Given, for example, that the occupied frequency bandwidth is ±4.5 kHz, the sampling frequency is 37.5 kHz, and the number of samples N is 75, the threshold value is configured to be "29". Further, given that the occupied frequency bandwidth is ±9 kHz, the bandwidth of the band-limiting filter will be twice as large, and the absolute value of the movement amount will be increased accordingly. Therefore, the threshold value is doubled to 58 from the previous value of "29". According to this variation, the precision of detection is improved.

Fastness of the operation of the signal detection device of the present invention will be discussed in a comparison with the squelch detection process. The time constant for integration is configured so that a squelch detection process does not yield a false determination due to a pulse noise, etc. This requires a period of time of about 60 ms for squelch determination as described above in the discussion of the related art. By way of contrast, the signal detection device of the receive device according to the invention requires, given a sampling frequency of 37.5 kHz, only 75 samples for detection as described above and so is capable of detecting a signal in 2 ms. The degree of increase in the speed depends of course on the symbol rate or frequency shift of the received signal, but the number of symbols or the threshold value required for signal detection may be configured as appropriate.

What is claimed is:

1. A receive device comprising:
   a quadrature detector;
   a first signal detector that detects whether a signal subjected to detection in the quadrature detector is a received signal, wherein the first signal detector includes a memory storing a program, wherein the program when executed by a computer, causes the computer to perform operations comprising:
      assigning the signal subjected to quadrature detection in the quadrature detector to an orthogonal plane divided into a plurality of quadrants and deriving an amount of movement of the signal assigned between quadrants,
      integrating absolute values of derived amounts of movement over a predetermined period of time, and
      determining whether the signal subjected to quadrature detection is a received signal by comparing an integrated value derived from the integrating with a threshold value;
   a band-limiting filter that limits a band of the signal subjected to quadrature detection in the quadrature detector, wherein the first signal detector configures the threshold value in accordance with a bandwidth of the band-limiting filter;
   a second signal detector that detects RSSI from the signal subjected to quadrature detection in the quadrature detector; and
   a demodulator that demodulates the signal subjected to quadrature detection in the quadrature detector,
   wherein the second signal detector includes a memory storing a program, wherein the program when executed by a computer, causes the computer to perform operations comprising:
      comparing the RSSI with an RSSI determination threshold value when the first signal detector identifies a received signal, and
      directing the demodulator to start demodulation when the RSSI is equal to or larger than the RSSI determination threshold value, and
   wherein:
      a difference between an average value of derived amounts of movement and an amount of movement derived in the deriving is derived,
      absolute values of derived differences are integrated over a predetermined period of time, and
      when the integrated value is smaller than the threshold value, it is determined that the signal is a received signal, and, when the integrated value is equal or larger than the threshold, it is determined that the signal is not a received signal.

2. A non-transitory computer readable recording medium encoded with a computer program, the program comprising computer-implemented modules including:
   assigning the signal subjected to quadrature detection to an orthogonal plane divided into a plurality of quadrants and deriving an amount of movement of the signal assigned between quadrants;
   integrating absolute values of derived amounts of movement over a predetermined period of time;
   determining whether the signal subjected to quadrature detection is a received signal by comparing an integrated value derived from the integrating with a threshold value;
   limiting a band of the signal subjected to quadrature detection, wherein the threshold value is configured in accordance with a bandwidth;
   detecting RSSI from the signal subjected to quadrature detection;
   demodulating the signal subjected to quadrature detection;
   comparing the RSSI with an RSSI determination threshold value when a received signal is identified; and
   demodulating when the RSSI is equal to or larger than the RSSI determination threshold value;
   wherein:
      a difference between an average value of derived amounts of movement and an amount of movement derived in the deriving is derived,
      absolute values of derived differences are integrated over a predetermined period of time, and
      when the integrated value is smaller than the threshold value, it is determined that the signal is a received signal, and, when the integrated value is equal or larger than the threshold, it is determined that the signal is not a received signal.

* * * * *